(12) United States Patent
Srinivasan et al.

(10) Patent No.: US 10,886,517 B2
(45) Date of Patent: Jan. 5, 2021

(54) BATTERY CELL SPACER

(71) Applicant: FORD GLOBAL TECHNOLOGIES, LLC, Dearborn, MI (US)

(72) Inventors: Giriraj Srinivasan, Troy, MI (US); Patrick Daniel Maguire, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 556 days.

(21) Appl. No.: 14/177,437

(22) Filed: Feb. 11, 2014

(65) Prior Publication Data

US 2015/0228953 A1  Aug. 13, 2015

(51) Int. Cl.
*H01M 2/18* (2006.01)
*H01M 2/14* (2006.01)
*H01M 2/10* (2006.01)
*H01M 10/6561* (2014.01)

(52) U.S. Cl.
CPC .......... *H01M 2/18* (2013.01); *H01M 2/1077* (2013.01); *H01M 2/14* (2013.01); *H01M 10/6561* (2015.04); *H01M 2220/20* (2013.01)

(58) Field of Classification Search
CPC ............................ H01M 2/18; H01M 2220/20
USPC ............................ 429/99–100, 120, 149–155
See application file for complete search history.

(56) References Cited

U.S. PATENT DOCUMENTS

| | | | |
|---|---|---|---|
| 4,336,314 A * | 6/1982 | Yonezu | H01M 2/0242 429/145 |
| 4,883,728 A | 11/1989 | Witehira | |
| 5,567,545 A * | 10/1996 | Murakami | 429/163 |
| 6,457,636 B1 * | 10/2002 | Van de Ven | B65D 5/324 206/517 |
| 7,550,228 B2 | 6/2009 | Izawa | |
| 8,124,262 B2 | 2/2012 | Okada et al. | |
| 8,394,525 B2 | 3/2013 | Maguire et al. | |
| 8,481,191 B2 | 7/2013 | Hermann | |
| 2003/0234281 A1 * | 12/2003 | Ho | B42F 7/08 229/67.3 |
| 2006/0254815 A1 * | 11/2006 | Humphrey | G06K 19/07327 174/380 |

(Continued)

FOREIGN PATENT DOCUMENTS

| | | |
|---|---|---|
| EP | 2355202 B1 | 3/2013 |
| JP | 2004362879 A | 12/2004 |

OTHER PUBLICATIONS

"Hinge." Oxford Dictionaries, https://en.oxforddictionaries.com/definition/us/hinge. Accessed Sep. 27, 2016.*

(Continued)

*Primary Examiner* — James Lee
(74) *Attorney, Agent, or Firm* — David B. Kelley; Carlson, Gaskey & Olds (57) ABSTRACT

Electrified vehicles such as hybrid electric vehicles (HEV's), plug-in hybrid electric vehicles (PHEV's), battery electric vehicles (BEV's), or fuel cell vehicles differ from conventional motor vehicles in that they are powered by one or more electric machines (i.e., electric motors and/or generators) instead of or in addition to an internal combustion engine. High voltage current for powering these types of electric machines is typically supplied by a high voltage traction battery system having one or more battery cells that store energy.

20 Claims, 7 Drawing Sheets

(56) References Cited

U.S. PATENT DOCUMENTS

| | | |
|---|---|---|
| 2007/0026303 A1 | 2/2007 | Jeon et al. |
| 2010/0022992 A1* | 1/2010 | Genosar ............ A61M 5/14248 |
| | | 604/891.1 |
| 2010/0233519 A1* | 9/2010 | Cheon .................... H01M 2/34 |
| | | 429/56 |
| 2012/0040235 A1* | 2/2012 | Cho .................... H01M 2/0207 |
| | | 429/156 |
| 2012/0177952 A1 | 7/2012 | Maguire et al. |
| 2013/0130086 A1* | 5/2013 | Schaefer ....................... 429/120 |
| 2013/0209847 A1 | 8/2013 | Lev et al. |
| 2014/0311933 A1* | 10/2014 | Kuehn ...................... B42F 7/08 |
| | | 206/425 |

OTHER PUBLICATIONS

"Flap." Collins Dictionary, https://owl.english.purdue.edu/owl/resource/747/18/. Accessed Sep. 27, 2016.*

* cited by examiner

BATTERY CELL SPACER

TECHNICAL FIELD

This disclosure relates to an electrified vehicle, and more particularly, but not exclusively, to a battery cell spacer or separator for separating adjacent battery cells of a battery module.

BACKGROUND

Electrified vehicles such as hybrid electric vehicles (HEV's), plug-in hybrid electric vehicles (PHEV's), battery electric vehicles (BEV's), or fuel cell vehicles differ from conventional engine vehicles in that they are powered by one or more electric machines (i.e., electric motors and/or generators) instead of or in addition to an internal combustion engine. High voltage current for powering these types of electric machines is typically supplied by a high voltage traction battery system having one or more battery cells that store energy.

Electrified vehicle battery systems often include one or more battery modules. Each battery module includes a plurality of battery cells and a plurality of discrete battery cell spacers that are arranged between each adjacent pair of battery cells of the battery module. For example, the battery cells and battery cell spacers are often stacked side-by-side in an alternating fashion in order to physically separate the neighboring cells from one another. The battery cell spacers may additionally facilitate cell cooling and isolation from other conductive surfaces.

SUMMARY

A battery cell spacer according to an exemplary aspect of the present disclosure includes, among other things, a unitary body including at least a first dividing wall and a second dividing wall spaced from the first dividing wall and a pocket defined between the first dividing wall and the second dividing wall. The unitary body is adjustable between a first position and a second position to change a dimension associated with the pocket.

In a further non-limiting embodiment of the foregoing battery cell spacer, the first dividing wall and the second dividing wall are parallel to one another.

In a further non-limiting embodiment of either of the foregoing battery cell spacers, a battery cell is received in the pocket.

In a further non-limiting embodiment of any of the foregoing battery cell spacers, an array structure is attached to at least one end of the unitary body.

In a further non-limiting embodiment of any of the foregoing battery cell spacers, the unitary body includes a plurality of walls and a plurality of pockets defined between adjacent walls of the plurality of walls.

In a further non-limiting embodiment of any of the foregoing battery cell spacers, the unitary body includes an accordion shape.

In a further non-limiting embodiment of any of the foregoing battery cell spacers, an end wall connects the first dividing wall and the second dividing wall.

In a further non-limiting embodiment of any of the foregoing battery cell spacers, the end wall includes a living hinge.

In a further non-limiting embodiment of any of the foregoing battery cell spacers, a hinged wall connects the first dividing wall and the second dividing wall.

In a further non-limiting embodiment of any of the foregoing battery cell spacers, at least one of the first dividing wall and the second dividing wall includes a flap that is movable between a first position and a second position to close off a bottom of the pocket.

In a further non-limiting embodiment of any of the foregoing battery cell spacers, the flap is connected to either the first dividing wall or the second dividing wall with a hinge.

In a further non-limiting embodiment of any of the foregoing battery cell spacers, the first dividing wall includes a first flap and the second dividing wall includes a second flap that extends toward the first flap, the first flap and the second flap engageable to one another to close off a bottom of the pocket.

A battery module according to another exemplary aspect of the present disclosure includes, among other things, a battery cell and a battery cell spacer that defines a pocket for receiving the battery cell, the battery cell spacer adjustable between an expanded position and a collapsed position to change a positioning of the battery cell spacer relative to the battery cell.

In a further non-limiting embodiment of the foregoing battery module, the battery cell spacer includes a first dividing wall, a second dividing wall parallel to the first dividing wall, the pocket defined between the first dividing wall and the second dividing wall for accommodating the battery cell.

In a further non-limiting embodiment of either of the foregoing battery modules, an end wall connects between the first dividing wall and the second dividing wall.

In a further non-limiting embodiment of any of the foregoing battery modules, the pocket includes a first dimension in the expanded position and a second, smaller dimension in the collapsed position.

A method according to another exemplary aspect of the present disclosure includes, among other things, positioning a battery cell in a pocket of a battery cell spacer and compressing the battery cell spacer to collapse the battery cell spacer about the battery cell.

In a further non-limiting embodiment of the foregoing method, the step of compressing includes applying a force to at least one array structure.

In a further non-limiting embodiment of either of the foregoing methods, the step of compressing includes adjusting a molded body of the battery cell spacer between an expanded position and a collapsed position.

In a further non-limiting embodiment of any of the foregoing methods, the method includes the step of closing off a bottom of the pocket with at least one flap.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a battery cell spacer for use within a battery module that accommodates one or more battery cells. The battery cell spacer may include a unitary or molded body made up of a plurality of walls. A pocket extends between adjacent dividing walls of the plurality of walls and can accommodate a battery cell. End or hinged walls may connect between the adjacent dividing walls. The unitary body of the battery cell spacer is adjustable between a first position and a second position, such as by applying a compressive force, to change a dimension of the pocket. These and other features are discussed in greater detail herein.

Figure 1:
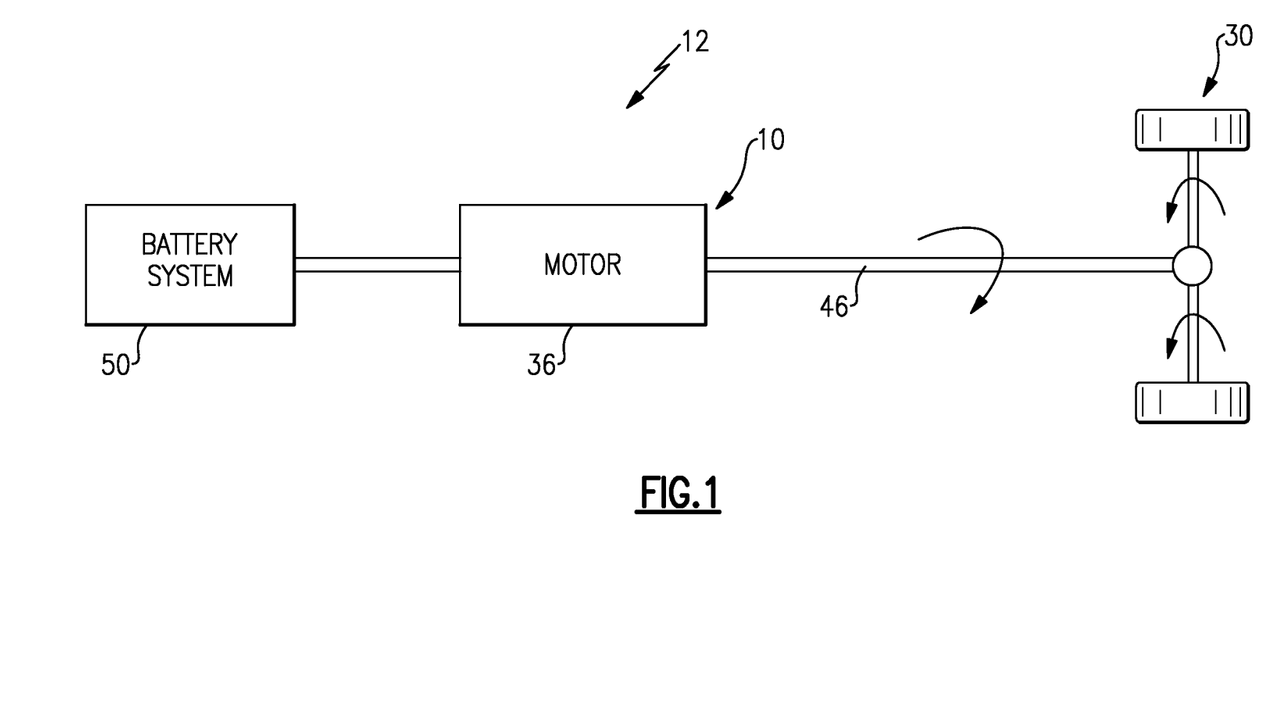
FIG. 1 schematically illustrates a powertrain of an electrified vehicle.

FIG. 1 schematically illustrates a powertrain 10 of an electrified vehicle 12. The electrified vehicle 12 may be a HEV, PHEV, BEV, or any other vehicle. In other words, this disclosure is not limited to any particular type of electrified vehicle.

The powertrain 10 includes a drive system having at least a motor 36 (i.e., an electric machine) and a battery system 50. The battery system 50 may include a high voltage battery that is capable of outputting electrical power to operate the motor 36. Although not shown, the battery system 50 may be made up of multiple battery modules.

The drive system generates torque to drive one or more sets of vehicle drive wheels 30 of the electrified vehicle 12. For example, the motor 36 can powered by the battery system 50 and employed to electrically drive the vehicle drive wheels 30 by outputting torque to a shaft 46. Of course, this view is highly schematic. It should be appreciated that other components, including but not limited to an internal combustion engine, a generator, a power transfer unit, and one or more control systems, could make up the powertrain 10 of the electrified vehicle 12.

Figure 2:
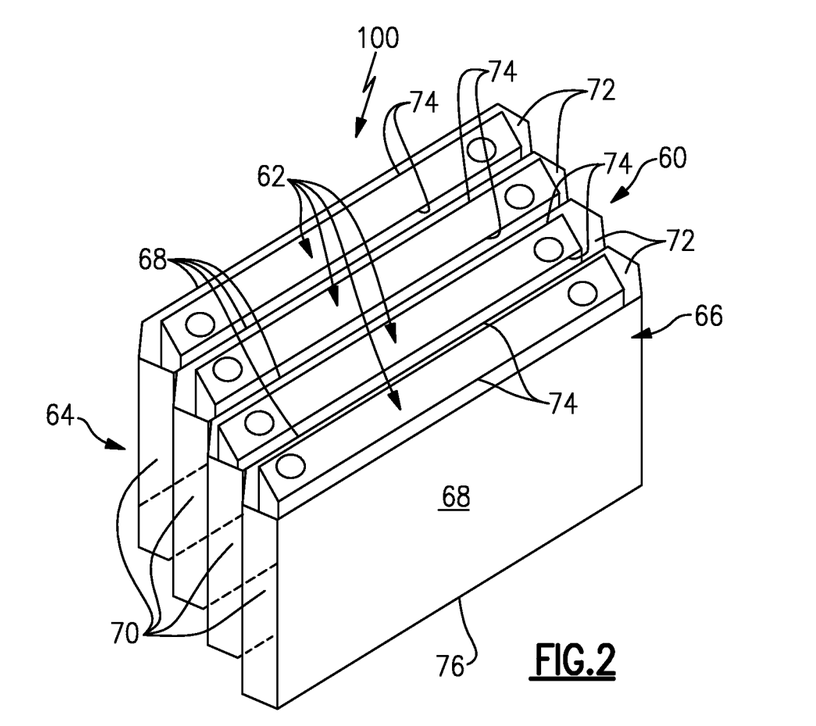
FIG. 2 illustrates a battery cell spacer that can be utilized to physically separate battery cells of a battery module.
Figure 3:
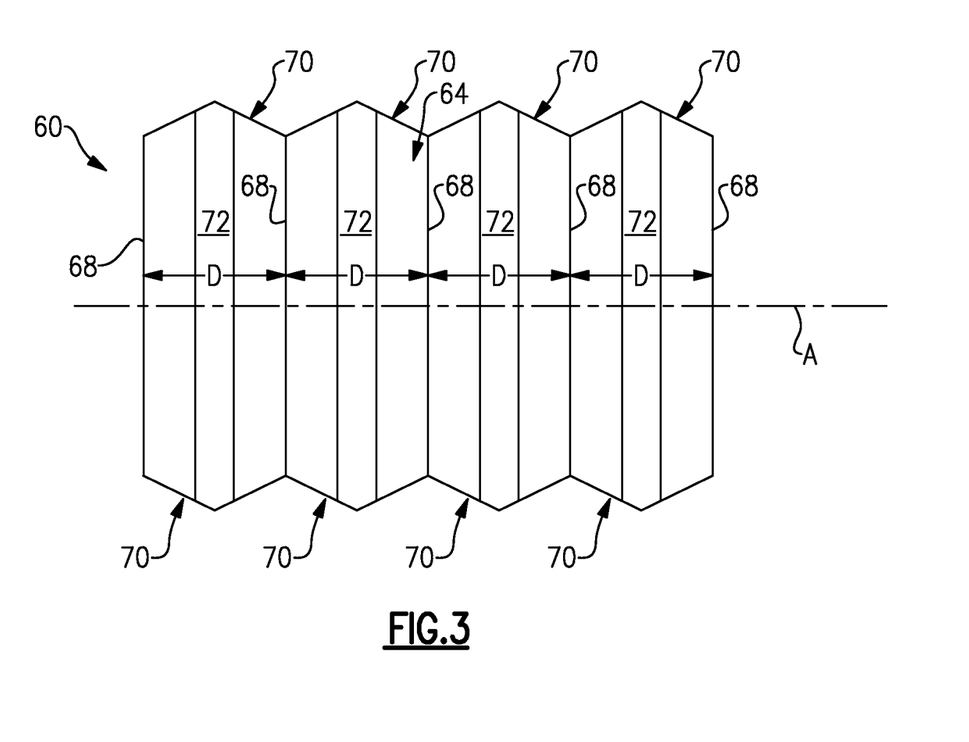
FIG. 3 illustrates a top view of a battery cell spacer.

FIGS. 2 and 3 illustrate a battery cell spacer 60 that can be used to construct a battery module 100 that includes one or more battery cells 62. The battery cells 62 are illustrated in FIG. 2 but are omitted in FIG. 3. The battery cell spacer 60 is scalable in size to accommodate any number of battery cells 62 and is not necessarily limited to the size, shape and configuration of the illustrated embodiment. For example, the battery cell spacer 60 could accommodate a single battery cell 62 or a multitude of battery cells 62 within the scope of this disclosure.

The battery cell spacer 60 may be a single-piece, unitary or molded part. For example, the battery cell spacer 60 may be a monolithic structure. The battery cell spacer 60 includes an accordion shape, in one non-limiting embodiment.

The battery cell spacer 60 may include a molded body 64 (or unitary body) made up of a plurality of walls 66. The plurality of walls 66 include dividing walls 68 that are spaced apart from one another along a longitudinal axis A (see FIG. 3), and end walls 70 that connect adjacent dividing walls 68 relative to one another. The end walls 70 are generally transverse to the dividing walls 68.

A pocket 72 extends between adjacent dividing walls 68 of the plurality of walls 66. Each pocket 72 defines an open space of the battery cell spacer 60 for accommodating a battery cell 62. For example, one battery cell 62 may be received within each pocket 72 to construct the battery module 100. The plurality of walls 66 may optionally include bottom walls 76 (see FIG. 2) that close-off the pockets 72 of the battery cell spacer 60.

In one embodiment, the dividing walls 68 are disposed in parallel to one another along the longitudinal axis A of the molded body 64. The dividing walls 68 are parallel with faces 74 of the battery cells 62.

In another non-limiting embodiment, the molded body 64 of the battery cell spacer 60 is adjustable between a first, expanded position and a second, compressed position to change a dimension D of the pocket(s) 72 (see FIG. 3). For example, the molded body 64 may be collapsible, such as by a compressive force, to move the dividing walls 68 into closer proximity with the battery cells 62. The adjustability of the battery cell spacer 60 is discussed in greater detail below with respect to FIGS. 9, 10 and 11.

In one embodiment, the molded body 64 is adjustable to any position between a fully expanded position (see FIGS. 3, 9 and 10) and a fully compressed position (see FIG. 11) by virtue of the inherent flexibility in one or more of the plurality of walls 66. The inherent flexibility of the molded body 64 may be provided by the end walls 70 or any other of the plurality of walls 66.

Figure 4:
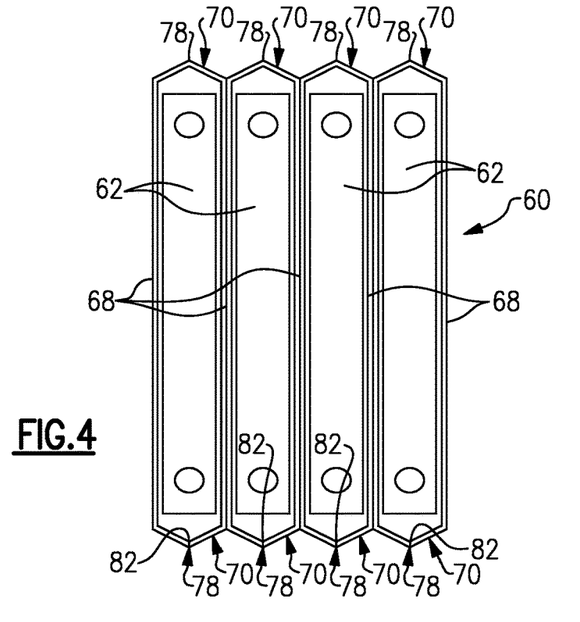
FIG. 4 illustrates a first embodiment of an end wall of a battery cell spacer.

In another embodiment, shown in FIG. 4, one or more of the end walls 70 include a living hinge 78. The living hinge 78 may be a thinned portion of the end wall 70 that allows the end wall 70 to collapse upon itself. For example, the end wall 70 may be thinned at an apex 82. The presence of the molded-in angled shape at the apex 82 causes the material of the end wall 70 to act as a living hinge.

By collapsing the end walls 70, the dividing walls 68 move closer to one another and change the dimension D associated with each pocket 72. Put another way, the spaces between the dividing walls 68 are reduced by collapsing the end walls 70.

Figure 5:
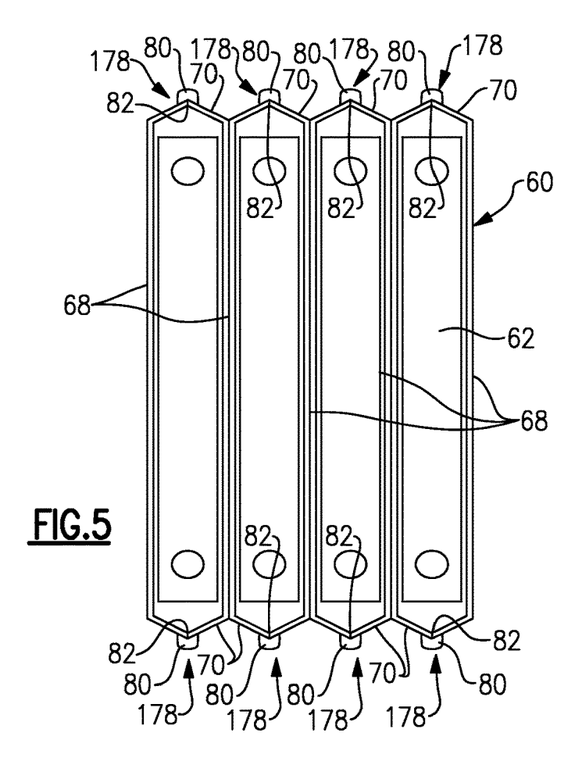
FIG. 5 illustrates a second embodiment of an end wall of a battery cell spacer.

Another living hinge 178 is illustrated in FIG. 5. In this disclosure, like reference numbers designate like elements where appropriate and reference numerals with the addition of 100 or multiples thereof designate modified elements that are understood to incorporate the same features and benefits of the corresponding original elements.

In this embodiment, the living hinge 178 includes a flap of material 80 rather than a thinned portion of the end wall 70. For example, an apex 82 of the end wall 70 may include the flap of material 80, which is a flexible walled section that acts as the living hinge 170 to collapse the end wall 70 during compression of the battery cell spacer 60. This design may be particularly useful where the material used to form the battery cell spacer 60 is relatively stiff. Other living hinge configurations are also contemplated as within the scope of this disclosure.

Figure 6A:
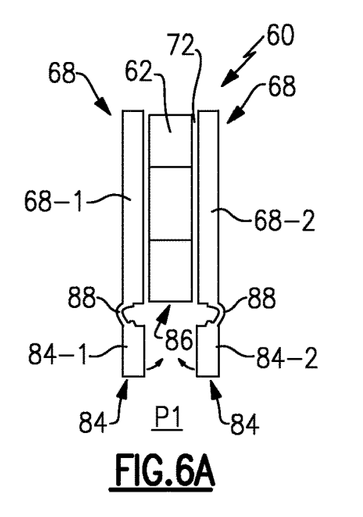
FIGS. 6A, 6B and 6C illustrate embodiments of a flap of a battery cell spacer.
Figure 6B:
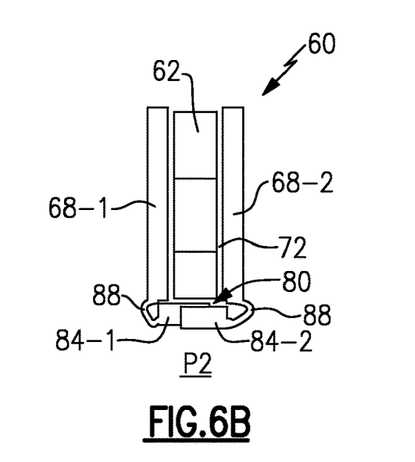

FIGS. 6A and 6B illustrate additional features that may be incorporated into a battery cell spacer 60. In this embodiment, each of the dividing walls 68 include a flap 84 that is movable to close off a bottom 86 of the pocket 72. The flaps 84 may be connected to the dividing walls 68 by a hinge 88.

The flaps 84 are rotatable or otherwise movable via the hinge 88 between a first position P1 (see FIG. 6A) and a second position P2 (see FIG. 6B) to close off the bottom 86 of the pocket 72. The second position P2 is generally transverse to the first position P1. In one non-limiting embodiment, a flap 84-1 of a first dividing wall 68-1 and a flap 84-2 of a second dividing wall 68-2 are pivoted toward one another to close off the bottom 86.

Figure 6C:
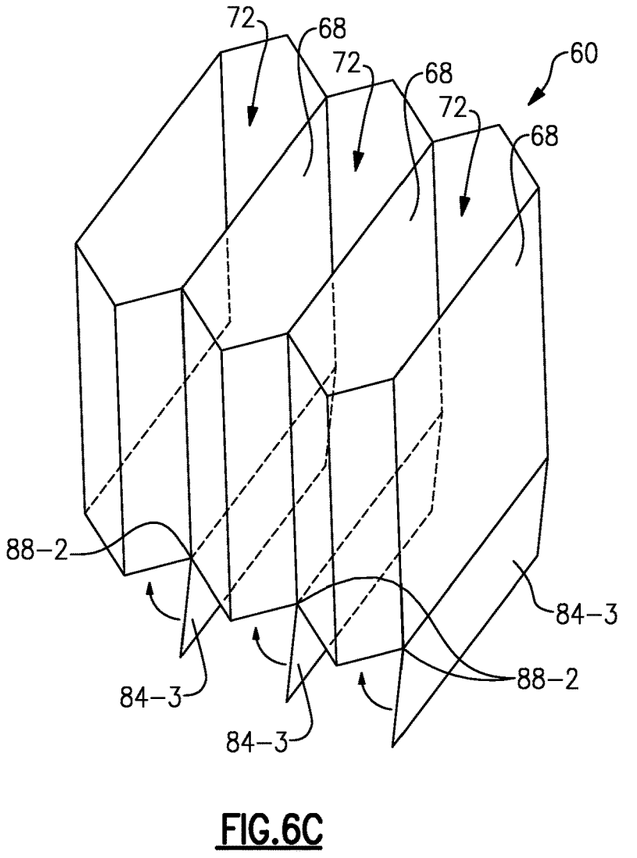

Alternatively, as shown in FIG. 6C, a single flap 84-3 may be provided on the dividing walls 68. The flap 84-3 is pivotable about a hinge 88-2 to close-off the bottom 86. The flap 84-3 may fold perpendicular under the battery cells to increase electrical isolation and creepage distance.

Figure 7A:
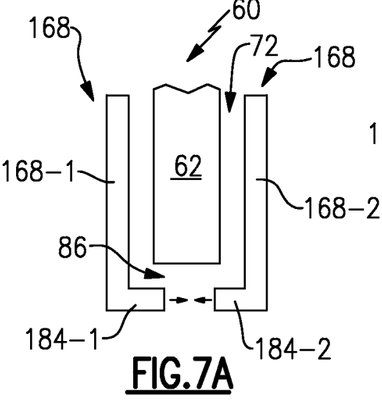
FIGS. 7A and 7B illustrate another embodiment of a flap of a battery cell spacer.
Figure 7B:
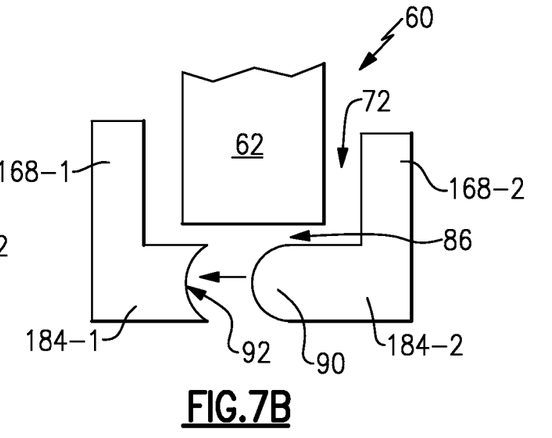

In another embodiment illustrated by FIGS. 7A and 7B, dividing walls 168 of a battery cell spacer 60 include opposed flaps 184-1, 184-2 that are engageble relative to one another to close off a bottom 86 of a pocket 72. The flap 184-1 extends transverse from a first dividing wall 168-1 and the flap 184-2 extends transverse from a second dividing wall 168-2. As the battery cell spacer 60 is adjusted (such as by collapsing one or more of the plurality of walls 66), a tongue 90 of the flap 184-2 is received within an opening 92 of the flap 184-1 to lock the flaps 184 relative to one another, thereby sealing off the bottom 86 of the pocket 72 (see FIG. 7B).

Figure 8A:
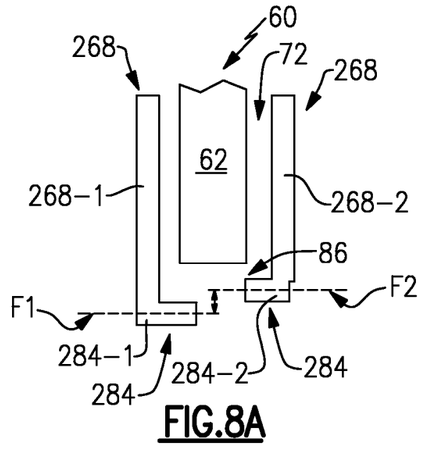
FIGS. 8A and 8B illustrate yet another embodiment of a battery cell spacer flap.
Figure 8B:
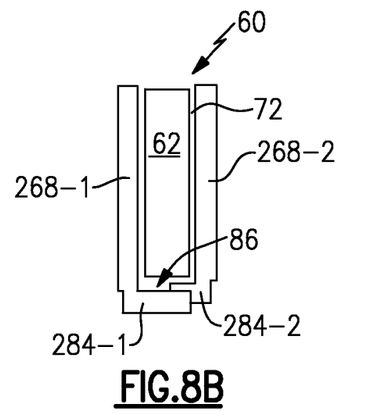

FIGS. 8A and 8B illustrate yet another embodiment of a flap 284 that may be designed into each dividing wall 268 of a battery cell spacer 60. In this embodiment, a flap 284-1 extends transverse from a first dividing wall 268-1 and the flap 284-2 extends transverse from a second dividing wall 268-2. In one embodiment, the flap 284-1 is offset from the flap 284-2. In other words, an axis F1 through the flap 284-1 is offset from an axis F2 that extends through the flap 284-2. In this way, during compression of the battery cell spacer 60, the flaps 284-1, 284-2 slide over one another to close off a bottom 86 of a pocket 72. One or both of the flaps 284-1, 284-2 could include a locating feature for guiding the flaps 284-1, 284-2 during the sliding movement that occurs therebetween.

Figure 9:
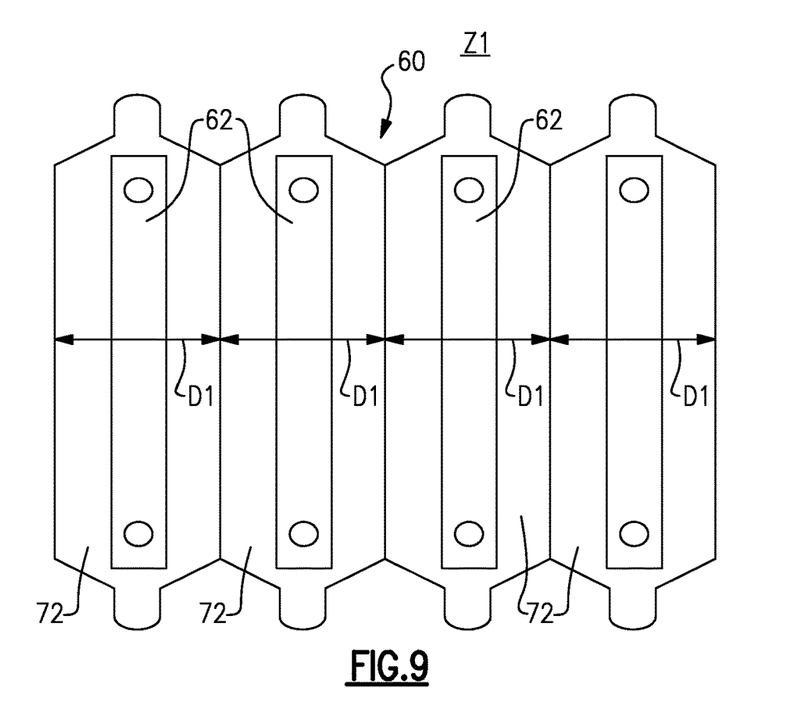
FIG. 9 schematically illustrates a first step of a battery module packaging method.
Figure 10:
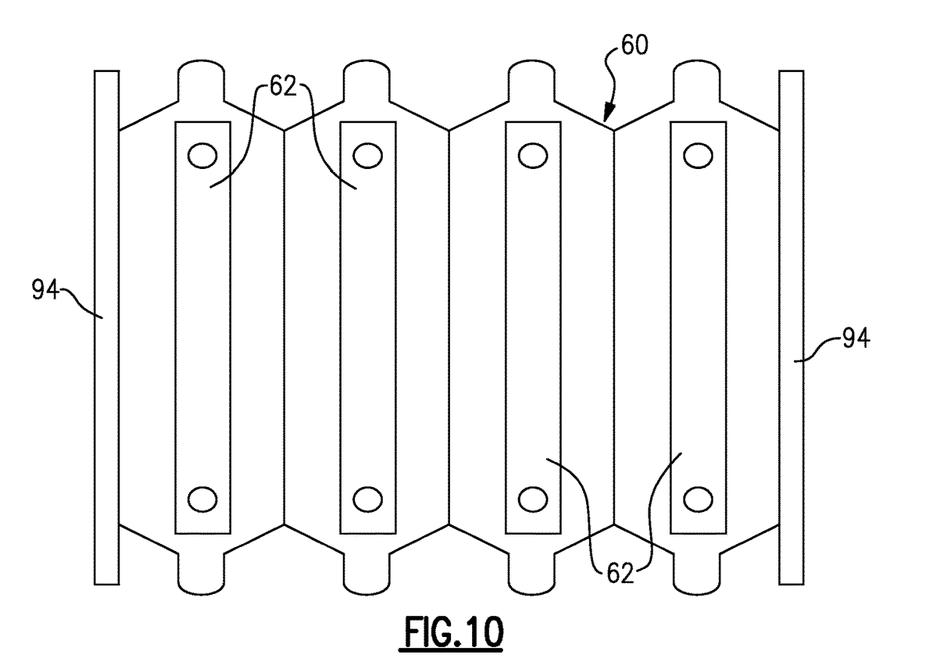
FIG. 10 schematically illustrates another step of a battery module packaging method.
Figure 11:
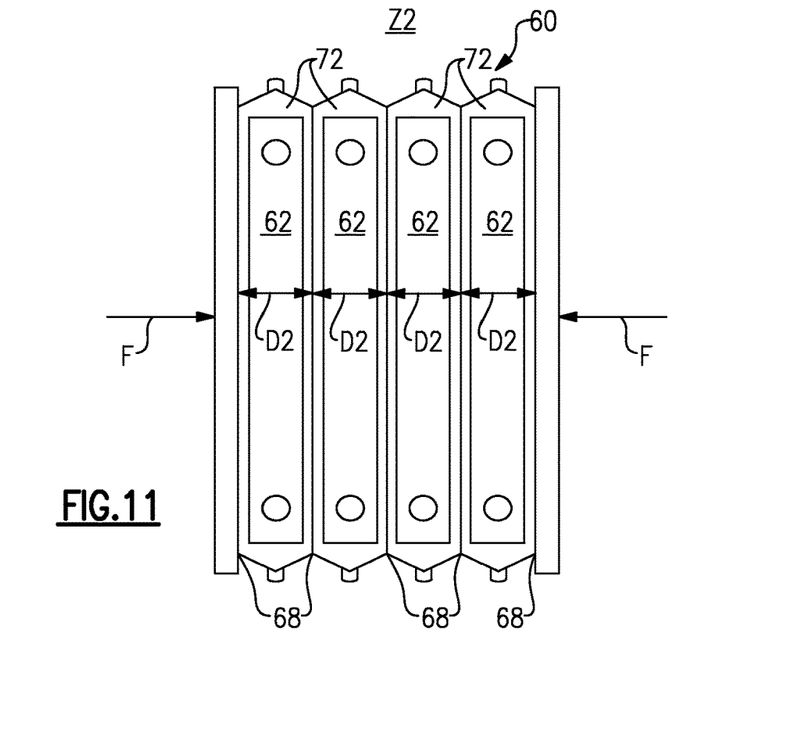
FIG. 11 schematically illustrates yet another step of a battery module packaging method.

FIGS. 9, 10 and 11 schematically illustrate a battery module packaging method. As shown in FIG. 9, one or more battery cells 62 may be positioned within pockets 72 of a battery cell spacer 60. The battery cells 62 are positioned within the pockets 72 with the battery cell spacer 60 in a first position Z1 (i.e., an expanded or non-collapsed position). In the first position Z1, the pockets 72 of the battery cell spacer 60 include a dimension D1 that is greater than the width of the battery cells 62 to provide clearance for receiving the battery cells 62. The battery cells 62 may be positioned within the pockets 72 either manually or via an automated assembly process.

As shown in FIG. 10, an array structure 94 may be positioned at one or both ends of the battery cell spacer 60. In one embodiment, the array structures 94 are molded as part of the unitary battery cell spacer 60. Alternatively, the array structures 94 could be separate structures that are attached to the battery cell spacer 60.

The battery cell spacer 60 is next adjusted to a second position Z2 (i.e., a compressed position), as show in FIG. 11. In the second position Z2, the pockets 72 include a dimension D2 that is smaller than the dimension D1. In one embodiment, the battery cell spacer 60 is moved to the second position Z2 by applying a force F to one or both of the array structures 94. The force F drives the dividing walls 68 closer to one another in order to collapse the battery cell spacer 60 about the battery cells 62. Rails, bands, straps or other tensioning members may be used to maintain the assembled battery module in the second position Z2.

Optionally, either during or after the compressing step shown in FIG. 11, a bottom of each pocket 72 may be closed off in the manners illustrated with respect to FIGS. 6A, 6B, 7A, 7B, 8A and 8B.

Figure 12:
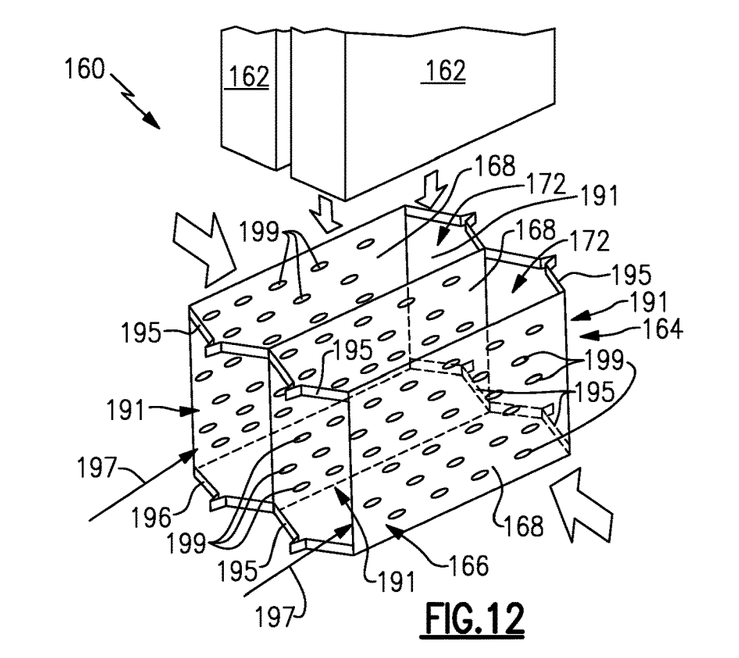
FIG. 12 illustrates a battery cell spacer according to another embodiment of this disclosure.

The battery cell spacer 60 of FIGS. 3-11 is particularly suitable for a liquid cooled battery system. FIG. 12 illustrates another exemplary battery cell spacer 160 that may be suited for an air cooled battery system.

The exemplary battery cell spacer 160 may include a unitary body 164 made up of a plurality of walls 166. The plurality of walls 166 include dividing walls 168 that are spaced apart from one another in a parallel relationship. A pocket 172 extends between adjacent dividing walls 168 of the plurality of walls 166. Each pocket 172 defines an open space of the battery cell spacer 160 for accommodating a battery cell 162. For example, one battery cell 162 may be received within each pocket 172 to construct a battery module.

In one embodiment, each dividing wall 168 includes a plurality of standoffs 199 that protrude inwardly from the dividing walls 168 in a direction toward the battery cells 162 (once the cells are positioned within the pockets 172). The standoffs 199 space the dividing walls 168 away from the battery cells 162 such that airflow 197 can pass between the dividing walls 168 and the battery cells 162 for cooling purposes.

One or more hinged walls 195 may connect adjacent dividing walls 168 to one another. In one non-limiting embodiment, the unitary body 164 of the battery cell spacer 160 is adjustable between a first, expanded position and a second, compressed position by collapsing the hinged walls 195. The hinged walls 195 do not extend across an entire height of the dividing walls 168 such that open spaces 191 may be defined at the dividing wall 168 ends. By collapsing the hinged walls 195, the dividing walls 168 are moved closer to one another and in closer proximity to the battery cells 162.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery cell spacer, comprising:
 a unitary body including at least a first dividing wall, a second dividing wall, and a hinged wall connecting said first dividing wall and said second dividing wall, said hinged wall including a first height that is less than a second height of said first dividing wall and said second dividing wall;

a pocket defined between said first dividing wall and said second dividing wall; and said unitary body flexible between a first position and a second position in which said first dividing wall and said second dividing wall are closer together to change a dimension associated with said pocket.

2. The battery cell spacer as recited in claim 1, wherein said first dividing wall and said second dividing wall are parallel to one another.

3. The battery cell spacer as recited in claim 1, comprising a battery cell received in said pocket.

4. The battery cell spacer as recited in claim 1, comprising an array structure attached to at least one end of said unitary body.

5. The battery cell spacer as recited in claim 1, wherein said unitary body includes a plurality of walls and a plurality of pockets defined between adjacent walls of said plurality of walls.

6. The battery cell spacer as recited in claim 1, wherein said unitary body includes an accordion shape.

7. The battery cell spacer as recited in claim 1, wherein at least one of said first dividing wall and said second dividing wall includes a flap that is movable between a first position and a second position to close off a bottom of said pocket.

8. The battery cell spacer as recited in claim 7, wherein said flap is connected to either said first dividing wall or said second dividing wall with a hinge.

9. The battery cell spacer as recited in claim 1, wherein said first dividing wall includes a first flap and said second dividing wall includes a second flap that extends toward said first flap, said first flap and said second flap engageable to one another to close off a bottom of said pocket.

10. The battery cell spacer as recited in claim 1, comprising a first battery cell received in said pocket and a second battery cell received in a second pocket established by said unitary body, at least one of said first dividing wall and said second dividing wall separating said first battery cell from said second battery cell.

11. The battery cell spacer as recited in claim 1, comprising an open space defined adjacent said hinged wall and extending between ends of said first dividing wall and said second dividing wall.

12. The battery cell spacer as recited in claim 1, wherein said first height and said second height extend in a direction from a bottom of said unitary body toward a top of said unitary body.

13. A battery module, comprising:
a battery cell; and
a battery cell spacer including a first dividing wall, a second dividing wall, an end wall connecting between said first and second dividing walls, and a pocket receiving said battery cell, said end wall including a living hinge adjustable to move said end wall between an expanded position and a collapsed position to change a positioning of said battery cell spacer relative to said battery cell.

14. The battery module as recited in claim 13, wherein said pocket includes a first dimension in said expanded position and a second, smaller dimension in said collapsed position.

15. The battery module as recited in claim 13, wherein said living hinge includes a thinned portion of said end wall configured to allow said end wall to collapse upon itself.

16. The battery module as recited in claim 13, wherein said living hinge includes a flap of material attached at an apex of said end wall.

17. The battery module as recited in claim 15, wherein said thinned portion is formed at an apex of said end wall.

18. A battery module, comprising:
a battery cell spacer having a unitary body including a first dividing wall, a second dividing wall, and an end wall connected to said first and second dividing walls, said end wall including a thinned portion that is thinner than a remaining portion of said end wall and is flexible between a first position and a second position to move said first and second dividing walls closer together.

19. The battery module as recited in claim 18, wherein said thinned portion is formed at an apex of said end wall.

20. A battery module, comprising:
a molded battery cell spacer including a first dividing wall, a second dividing wall, a third dividing wall, a first end wall, a second end wall, a third end wall, and a fourth end wall;

wherein the first and second end walls connect between the first and second dividing walls;

wherein the third and fourth end walls connect between the second and third dividing walls;

a first pocket established by the first and second dividing walls and the first and second end walls;

a first battery cell positioned within the first pocket;

a second pocket established by the second and third dividing walls and the third and fourth end walls; and a second battery cell positioned within the second pocket, wherein the first, second, third, and fourth end walls are each flexible between an expanded position and a collapsed position to move the first, second, and third dividing walls closer together, wherein, in the collapsed positions of the first, second, third, and fourth end walls, the first and second dividing walls are contiguous with the first battery cell and the second and third dividing walls are contiguous with the second battery cell.

* * * * *